Dec. 18, 1956   L. W. BENNETT   2,774,241
WEIGHT MEASURING, THRUST DETERMINING APPARATUS
Filed Oct. 4, 1954   2 Sheets-Sheet 1

INVENTOR.
LOWELL W. BENNETT
BY
*[signature]*
ATTORNEYS

Dec. 18, 1956  L. W. BENNETT  2,774,241
WEIGHT MEASURING, THRUST DETERMINING APPARATUS
Filed Oct. 4, 1954  2 Sheets-Sheet 2

INVENTOR.
LOWELL W. BENNETT
ATTORNEYS

United States Patent Office 2,774,241
Patented Dec. 18, 1956

2,774,241

WEIGHT MEASURING, THRUST DETERMINING APPARATUS

Lowell W. Bennett, Derwood, Md., assignor to the United States of America as represented by the Secretary of the Navy Application October 4, 1954, Serial No. 460,288

2 Claims. (Cl. 73—116)

This invention relates generally to a weight measuring, thrust determining arrangement, and more particularly to apparatus for simultaneously determining the loss of weight of a missile propellant as well as the thrust developed by the propellant as a function of time.

This invention is an improvement of "Thrust Measuring Apparatus," invented by David D. Grimes and Lowell W. Bennett, described and claimed in U. S. patent application Serial No. 460,289, filed October 4, 1954.

In the development of aerial missiles of the rocket type, it is necessary to know the rate of loss of weight of a missile propellant, and also the total weight of the propellant consumed as a function of time. In addition, it is important, for design purposes, to know the thrust being developed due to the burning of the missile propellant as a function of time.

It is an object of this invention, therefore, to provide an arrangement for simultaneously recording the loss of weight of a missile propellant as well as thrust developed thereby during the burning of the propellant.

Another object of the invention is to provide an arrangement for recording the loss of weight of a missile propellant during burning thereof so that changes in thrust of a missile encountered in a normal run will have no significant effect on weight reading.

Other objects and many of the attendant advantages of this invention will be readily appreciated as the same becomes better understood by reference to the following detailed description when considered in connection with the accompanying drawing, in which.

In accordance with the invention, apparatus is provided for measuring the loss of weight of a missile propellant as well as the thrust developed by the propellant during burning thereof as a function of time. This apparatus includes a thrust stand having a base plate, together with means including a pair of vertically spaced spring members which are mounted on the base plate for supporting a parallel spaced plate having a missile mounted thereon, such as a rocket motor.

The spring members maintain the missile substantially parallel to the plates during burning of the propellant therein. Additional means are provided for deflecting a transducer when the missile propellant is burning. The deflections of the transducer can be converted into force or thrust indications by suitable means and then recorded for permanent record.

On top of the thrust stand there can be provided additional means including a second pair of horizontal spaced spring members which are utilized for supporting the rocket motor and for measuring the loss of weight of the missile propellant during burning thereof simultaneously with determining the thrust force developed by the same propellant as a function of time.

The weight measuring arrangement can be used simultaneously with the thrust determining arrangement, or independently thereof. Indications of the loss of weight of the propellant during burning are transmitted to a remote point by a transducer element for recording by suitable means.

Figure 1:
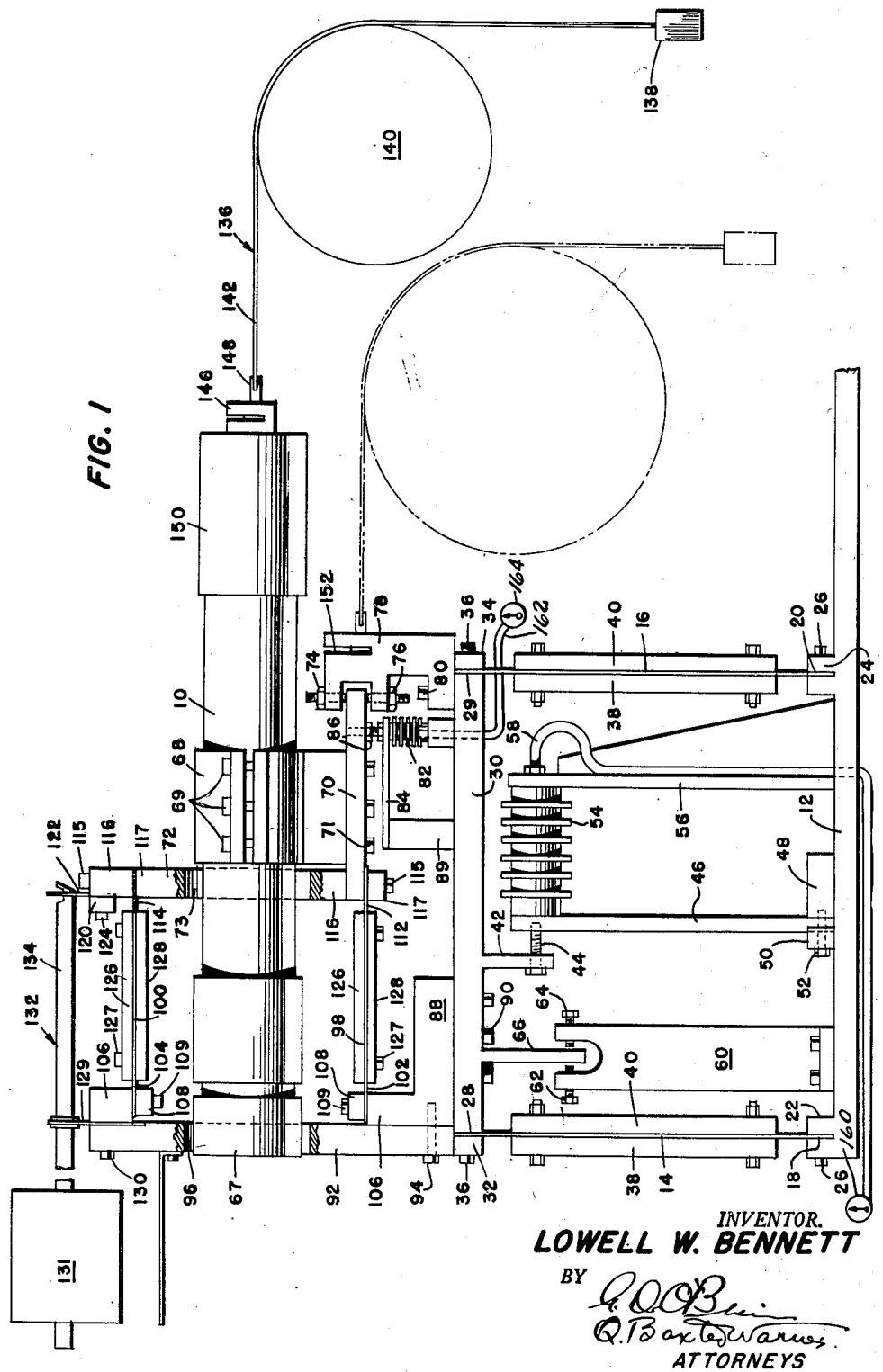
Fig. 1 is a side view of an arrangement for measuring the loss of weight as well as the thrust developed by a missile propellant as a function of time.

Referring now to Fig. 1, there is illustrated apparatus for determining thrust developed by the propellant of a missile, such as a rocket motor 10. This apparatus includes a fixed plate 12 mounted on a suitable foundation by bolts, both of which are not shown.

Two vertically mounted and spaced leaf springs 14 and 16 are supported by the base plate 12. These springs have their lower ends attached to base plate 12 at points 18 and 20 by means of horizontal, transverse bar members 22 and 24, which have slots provided therein for receiving the ends of the springs. The members 22 and 24 can be formed integral with or attached to plate 12. Bolts 26 are utilized for hinging the leaf springs 14 and 16 to bar members 22 and 24. The upper ends of these leaf springs 14 and 16 are hinged to a top plate 30 at points 28 and 29, respectively. This plate 30 is mounted parallel to plate 12.

The upper ends of leaf springs 14 and 16 are secured to plate 30 by horizontal, transverse bars 32 and 34 of the same width as the springs 14 and 16, by bolts 36. Stiffening plates 38 and 40 are fastened to leaf springs 14 and 16 by bolts 42. Leaf springs are used instead of conventional hinges in order to eliminate friction and hysteresis in the arrangement.

Plate 30 has a vertically extending leg portion 42, which can be formed integral therewith, for supporting a positioning bolt 44. This bolt 44 can be adjusted to position a cantilever beam or spring 46, which has its lower end fixed between a suitable horizontally arranged bar member 48, which is attached to base 12, and a bar member 50, by a plurality of bolts, such as 52.

The upper free end of the cantilever beam 46 is free to move to deflect a transducer 54 which is mounted on a bracket member 56 extending from base plate 12. Transducer 54 has an outlet tube 58, which is connected to a suitable indicating means, such as a pressure gage 160, and recording means (not shown) such as an oscilloscope arrangement.

A bracket 60, secured to base plate 12, is used in conjunction with adjusting screws 62 and 64, which engage another leg portion 66 of base plate 30, for limiting the movement of plate 30 and the transducer 54 so as to eliminate any possibility of damaging the latter.

Electrical motion transducers of either the capacitive or inductive types can be used in place of the mechanical transducer 54. Also, electric strain gages, in a proper electric circuit, could be mounted on the cantilever beam or spring 46. These could be used in conjunction with the transducer 54, or could replace the transducer 54.

The arrangement for measuring the loss in weight of the missile propellant as a function of time is mounted on top of base plate 30, as will now be described. The missile, such as the test rocket motor 10 having an exit nozzle 67, is mounted between arms of a clamp 68 which maintain the rocket motor 10 in position. Bolts 69 maintain the arms of the clamp 68 in position. This clamp 68, in turn, is supported on a clamp base 70 and is maintained in position by bolts 71.

At one end of the clamp base 70 there is mounted a vertical forward support 72 which has an opening 73 therein for receiving the rocket motor 10. The other end of the clamp base 70 is located between two adjusting screws or bolts 74 and 76 which are mounted on a beam stop 78. Beam stop 78, in turn, is mounted at one end of base plate 30 by means of bolts, such as indicated by 80. The screws 74 and 76 limit the movement of the clamp base 70 so as to prevent damage to a transducer 82, which is connected by a tube 162 to a suitable sensing and indicating means, such as a pressure gage 164, and recording means (not shown) such as an oscilloscope arrangement.

This transducer 82, which is utilized for indicating the deflection of the rocket motor 10, is located between the free end of a cantilever beam 84, an adjusting screw 86, and base plate 30. Cantilever beam 84 has its other end fixed to base plate 30 by a suitable bracket member 89. The purpose of this transducer 82 will be described more in detail hereinafter.

An angle base 88 is secured to the base plate 30 by means of bolts 90. This angle base 88, in turn, is secured to a vertical aft support 92, by means of bolts 94. The aft support 92 is arranged parallel to the forward support 72. This aft support 92 has an opening 96 therein for receiving the rear end of the rocket motor 10. The aft support 92, it is to be noted is fixed in position, while the forward support 72 is arranged to be movable vertically.

A pair of leaf springs 98 and 100 are mounted between the aft and forward supports 92 and 72. These leaf springs 98 and 100 are vertically spaced from each other and are mounted in horizontal planes. Leaf springs 98 and 100 have stiffener or flexure plates 126 and 128 secured thereto by bolts 127 for stiffening of the leaf springs. Ends 102 and 104 of leaf springs 98 and 100 are hinged to the aft support 92 by means of aft spring clamps 106 and bar members 108. The bar members 108 are attached to the aft spring clamp by means of bolts 109. Ends 112 and 114 of springs 98 and 100, respectively, are hinged to the forward support 72 by means of forward clamps 116 and bars 117 which are maintained in position by means of bolts such as 115.

A back clamp bar member 120 is utilized to secure a leaf spring 122 to the forward clamp 116 by means of bolts such as 124. The aft spring clamp 106 together with the upper end of the aft support 92, is utilized for supporting a second leaf spring 129 by means of bolts 130.

The leaf springs 122 and 129 support a weight lever arrangement 132 in order to balance the tare of the rocket motor 10. This weight-lever arrangement 132 comprises an arm 134 which is pivotally mounted about leaf spring 129. The other end of arm 134 is free to move in the leaf spring 122. This lever arm 134 has a movable weight 131 on its other end to balance the weight of the empty rocket motor 10, that is, the tare of the motor 10.

In order to obtain a calibration curve of force representing thrust versus deflection, a spring steel tape 136 is utilized in conjunction with weights placed on a holder 138 and a pulley wheel 140 which can be mounted on the base plate 12 near one end thereof by means of vertical plate members, not shown.

End 142 of tape 136 is secured to a headed pin 148 which is inserted in a slotted boss 146 mounted to the head 150 of the rocket motor 10. Tape 136 passes over the pulley wheel 140. The weight holder 138 is mounted on the vertical end of the tape 136 and weights are placed on this holder 138 for calibration purposes.

A similar arrangement can be used in the event that it is desired to mount the rocket motor 10 directly on top of the base plate 30 in order to eliminate the weight measuring arrangement previously described. In this case, the rocket motor 10 would be mounted on the base plate 30 and the beam stop 78 would correspond to the slotted boss 146. The head of pin 148 would be received in a slot 152 located in the beam stop 78.

Prior to determining the actual thrust as a function of time for rocket motor 10, a calibration curve of thrust versus deflection or displacement is first obtained. This curve is obtained by setting the positioning screw 44 so that it is in contact with the free end of the transducer 54 without displacing the transducer 54. Weights are then added to the weight holder 138, and readings are then recorded of calibration thrust as a function of displacement of the transducer 54. The tape 136 is then disconnected from the rocket motor 10.

In order to obtain a calibration curve of loss of propellant in the rocket motor 10 as a function of displacement, the counterweight 131 is first adjusted to balance for the tare of the rocket motor 10 without the propellant being in position in the rocket motor 10. Weights are then placed on the clamp member 68 and readings are recorded of the deflection or displacement of the transducer element 82. Thus, a weight versus deflection curve is obtained corresponding to a propellant in the rocket motor 10.

Figure 2:
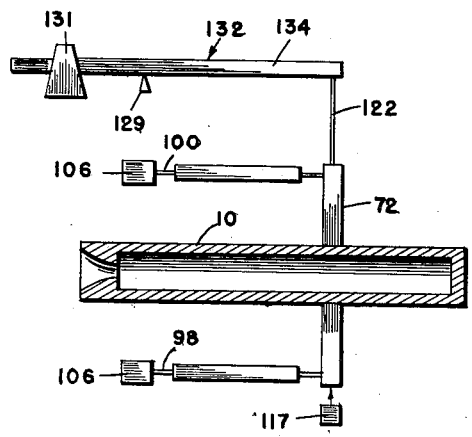
Fig. 2 is a schematic of the arrangement of Fig. 1 at rest.
Figure 3:
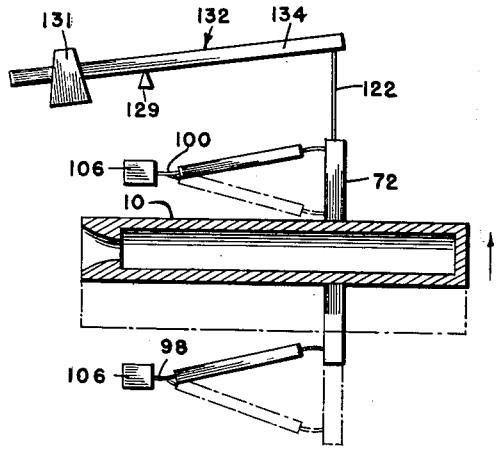
Fig. 3 is a schematic of the arrangement of Fig. 1 during operation thereof.

Prior to firing the rocket, the leaf springs 98 and 100 are adjusted to be in a parallel position, as indicated in Fig. 2. This is necessary in order that when the weight measuring device is being operated the leaf springs 98 and 100 are maintained nearly parallel to the longitudinal axis of the rocket motor 10 so that the thrust encountered in a normal test run will have no significant effect on the weight reading.

In operation, the propellant is placed in the rocket motor 10 and it is then ignited. As previously indicated, the transducers 54 and 82 are displaced or deflected and the fluid pressure therefrom can be transmitted to indicating and recording means at remote points to record the loss of weight of the propellant as a function of time and the thrust developed by the propellant also as a function of time. This information is then used in conjunction with the calibration curves for design purposes.

Obviously many modifications and variations of the present invention are possible in the light of the above teachings. It is therefore to be understood that within the scope of the appended claims the invention may be practiced otherwise than as specifically described.

What is claimed is:

1. A weight measuring, thrust determining arrangement for simultaneously determining the loss of weight of a missile propellant as well as the thrust developed by the propellant during the burning thereof as a function of time, comprising, means including a plurality of leaf springs for supporting a missile motor having a propellant therein and for maintaining said missile motor substantially horizontally during burning of said propellant, means for sensing and indicating the horizontal displacement of said missile motor during burning of said propellant, means including a second plurality of leaf springs for vertically supporting said missile motor, and means for sensing and indicating the vertical displacement of said missile motor as a function of the burning of the propellant therein.

2. A weight measuring, thrust determining arrangement for simultaneously determining the loss of weight of a missile propellant as well as the thrust developed by the propellant during the burning of said propellant as a function of time, comprising, a first base plate, means including at least a pair of vertical spring elements horizontally spaced and mounted on said base plate, a second base plate mounted on top of said pair of elements, means including at least a second pair of spring elements vertically spaced and mounted on said second base plate for supporting a missile motor, said first pair of spring elements maintaining said missile motor substantially parallel to said first base plate during burning of the propellant therein and allowing said missile to be horizontally displaced and said second pair of spring elements allowing said missile motor to be vertically displaced during the burning of the propellant therein, and means for sensing and indicating the loss of weight of said propellant and the thrust developed by said propellant during the burning thereof, both as a function of time.

References Cited in the file of this patent

UNITED STATES PATENTS

| | | |
|---|---|---|
| 2,353,033 | Hem | July 4, 1944 |
| 2,448,528 | Heuver | Sept. 7, 1948 |
| 2,498,995 | Manning | Feb. 28, 1950 |
| 2,657,574 | Whitehead | Nov. 3, 1953 |
| 2,680,373 | Bechberger | June 8, 1954 |